United States Patent
Cheng et al.

(10) Patent No.: US 7,972,744 B2
(45) Date of Patent: Jul. 5, 2011

(54) FUEL CELL ASSEMBLY

(75) Inventors: Yang T. Cheng, Rochester Hills, MI (US); Michael J. Lukitsch, Marysville, MI (US); William R. Rodgers, Bloomfield Township, MI (US); Paula D. Fasulo, Eastpointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1390 days.

(21) Appl. No.: 11/233,386

(22) Filed: Sep. 22, 2005

(65) Prior Publication Data

US 2006/0068257 A1    Mar. 30, 2006

Related U.S. Application Data

(60) Provisional application No. 60/613,674, filed on Sep. 28, 2004.

(51) Int. Cl.
*H01M 8/10* (2006.01)

(52) U.S. Cl. ......... 429/483; 429/492; 429/494; 429/495

(58) Field of Classification Search ................ 429/30, 429/33, 34, 41, 46; 521/27, 30, 33
See application file for complete search history.

(56) References Cited

U.S. PATENT DOCUMENTS

| | | | |
|---|---|---|---|
| 4,744,914 A | 5/1988 | Filisko et al. | |
| 4,879,056 A | 11/1989 | Filisko et al. | |
| 5,010,049 A | 4/1991 | Villa-Garcia | |
| 5,527,766 A | 6/1996 | Eddy | |
| 5,650,377 A | 7/1997 | Kern et al. | |
| 6,074,692 A | 6/2000 | Hulett | |
| 6,133,814 A | 10/2000 | Okada et al. | |
| 6,190,752 B1 | 2/2001 | Do et al. | |
| 6,215,037 B1 | 4/2001 | Padin et al. | |
| 6,388,268 B1 | 5/2002 | Kim et al. | |
| 6,524,736 B1 | 2/2003 | Sompalli et al. | |
| 6,585,952 B1 | 7/2003 | Pinnavaia et al. | |
| 6,630,265 B1 | 10/2003 | Taft, III et al. | |
| 6,746,659 B2 | 6/2004 | Pinnavaia et al. | |
| 6,770,258 B2 | 8/2004 | Pinnavaia et al. | |
| 6,780,806 B1 | 8/2004 | Yang et al. | |
| 2002/0034675 A1* | 3/2002 | Starz et al. | 429/42 |
| 2004/0048129 A1* | 3/2004 | Taft et al. | 429/33 |
| 2005/0027059 A1 | 2/2005 | Fasulo et al. | |
| 2005/0139380 A1 | 6/2005 | Knoll et al. | |

FOREIGN PATENT DOCUMENTS

| | | |
|---|---|---|
| JP | 3-283679 | 12/1991 |
| JP | 6-85337 | 3/1994 |
| JP | 2000-261053 | 9/2000 |
| JP | 2001-168404 | 6/2001 |

(Continued)

OTHER PUBLICATIONS

Pedarnig, J.D., et al., "Patterning of YBa2Cu3O7—Films using a Near-Field Optical Configuration", Appl. Phys. A., vol. 67, pp. 403-405, 1998.

(Continued)

*Primary Examiner* — Raymond Alejandro

(57) ABSTRACT

A composite electrolyte membrane for a fuel cell is disclosed. The membrane is formed of a polymer having layers of a clay-based cation exchange material. The substrate comprises an electrode formed from a solution that has an exfoliated, inorganic, sodium-based cation exchange material, an ionically conductive polymer-based material, and a solvent-dispersant.

16 Claims, 5 Drawing Sheets

FOREIGN PATENT DOCUMENTS

| WO | WO 01/08232 A2 | 2/2001 |
|---|---|---|
| WO | WO 01/18885 A1 | 3/2001 |
| WO | WO 01/26165 A2 | 4/2001 |

OTHER PUBLICATIONS

Cobb, Coleman B., et al., "Hysteretic Loss Reduction in Striated YBCO", Physica C., vol. 382, pp. 52-56, 2002.

Carr, Jr., W.J., et al., "Filamentary YBCO Conductors for AC Applications", IEEE Transactions on Applied Superconductivity, vol. 9, No. 2, pp. 1475-1478, Jun. 1999.

Sumption, M.D., et al., Hysteretic Loss vs. Filament Width in Thin YBCO Films Near the Penetration Field, IEEE Transactions on Applied Superconductivity, vol. 13., No. 2, pp. 3553-3556, Jun. 2003.

Suzuki, Y., "Transport Properties of Patterned Thin Lines From Epitaxial YBCO", Cornell Nanofabrication Facility, National Nabnofabrication Users Network, pp. 178-179.

Meltaus, J., et al., "High Temperature Superconducting Thin-Film Patterning for Microwave Applications", Materials Physics Laboratory, Helsinki University of Technology, 1 pg.

Hakola, A., "Patterning of HTS Thin Films", Department of Engineering Physics and Mathematics, Helsinki University of Technology, http://www.hut.fi/Units/AES/projects/prlaser/patterning.htm, 2 pgs.

"State-of-the-art of the HTS Microfabrication Technology", http://www.imel.demokritos.gr/web/NATO_973718/Proposal/stateoftheart_ofHTStechnol . . . , 4 pgs, Jul. 17, 2003.

Tralshawala, N., et al., "Session K20—Industrial Applications of High-Temperature Superconductor Materials", Mixed Session, Wednesday afternoon, Mar. 19, 5 pgs.

U.S. Appl. No. 10/750,144, filed Dec. 21, 2003, Allan Robert Knoll, et al.

Q. Deng, et al., Nafion®/($SiO_2$, ORMOSIL, and Dimethylsiloxane) Hybrids via In Situ Sol-Gel Reactions: Characterization of Fundamental Properties, Department of Polymer Science, University of Southern Mississippi, received Sep. 16, 1997; accepted Oct. 13, 1997, pp. 747-763.

D.H. Jung, et al., Preparation and performance of a Nafion®/montmorillonite nanocomposite membrane for direct methanol fuel cell, Journal of Power Sources 118 (2003), pp. 205-211.

Zhi-Gany Shao, et al., Preparation and characterization of hybrid Nafion-silica membrane doped with phosphotungstic acid for high temperature operation of proton exchange membrane fuel cells, Journal of Membrane Science 229 (2004), pp. 43-51.

Qingfend Li, et al., Approaches and Recent Development of Polymer Electrolyte Membranes for Fuel Cells Operating above 100° C., Chem. Matter. 2003 15, pp. 4896-4915.

\* cited by examiner

_US 7,972,744 B2_

FUEL CELL ASSEMBLY

CROSS-REFERENCE TO RELATED APPLICATIONS

This application claims the benefit of U.S. Provisional Application No. 60/613,674, filed on Sep. 28, 2004. The disclosure of the above application is incorporated herein by reference.

FIELD OF THE INVENTION

The present invention relates to fuel cells, membrane electrode assemblies (MEAs) and proton exchange membranes, also known as polymer electrolyte membranes (PEMs).

BACKGROUND OF THE INVENTION

Electrochemical cells are desirable for various applications, particularly when operated as fuel cells. Fuel cells have been proposed for many applications including electrical vehicular power plants to replace internal combustion engines. One fuel cell design uses a solid polymer electrolyte (SPE) membrane or proton exchange membrane (PEM), to provide ion exchange between the anode and cathode. Gaseous and liquid fuels are useable within fuel cells. Examples include hydrogen and methanol, with hydrogen being favored. Hydrogen is supplied to the fuel cell's anode. Oxygen (as air) is the cell oxidant and is supplied to the cell's cathode. The electrodes are formed of porous conductive materials, such as woven graphite, graphitized sheets, or carbon paper to enable the fuel to disperse over the surface of the membrane facing the fuel supply electrode. A typical fuel cell is described in U.S. Pat. No. 5,272,017 and U.S. Pat. No. 5,316,871 (Swathirajan et al.).

Degradation of fuel cell components, especially MEAs and PEMs, leads to a decline in power output and useful life. Thus, improved physical, chemical and mechanical properties are desired.

SUMMARY OF THE INVENTION

The Polymer Electrolyte Membrane (PEM) is a crucial component in a typical PEM Fuel Cell. Currently, PEM fuel cells are made of perfluorinated ionomers such as DuPont's NAFION®. Neither perfluorinated nor hydrocarbon ionomers have demonstrated acceptable durability (lifetime >5,000 hours) under fuel cell operation conditions. A thinner ionomer is desired to improve proton transport. Improved dimensional stability is desired during uptake of water. Enhanced temperature stability is desired in the high temperature environment of a fuel cell. This invention provides a method to form an improved layer comprising ionomer and thus yield enhanced fuel cell life and improved performance.

In one aspect, a composite electrolyte membrane is fabricated by applying a solution onto a surface of a substrate, then removing the solvent to form a layer of the composite electrolyte membrane. The substrate comprises an electrode; and the solution comprises an exfoliated, inorganic, sodium-based cation exchange material, an ionically conductive polymer-based material, and a solvent-dispersant. Optionally, the substrate can include a support decal.

In another aspect, a fuel cell consists of a membrane electrode assembly (MEA) comprising a membrane sandwiched between first and second electrodes. The membrane comprises exfoliated montmorillonite clay (MM) dispersed in an ionically conductive polymer matrix, where the MM has cation exchange sites with at least a portion of the sites having Group 1 metal cations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
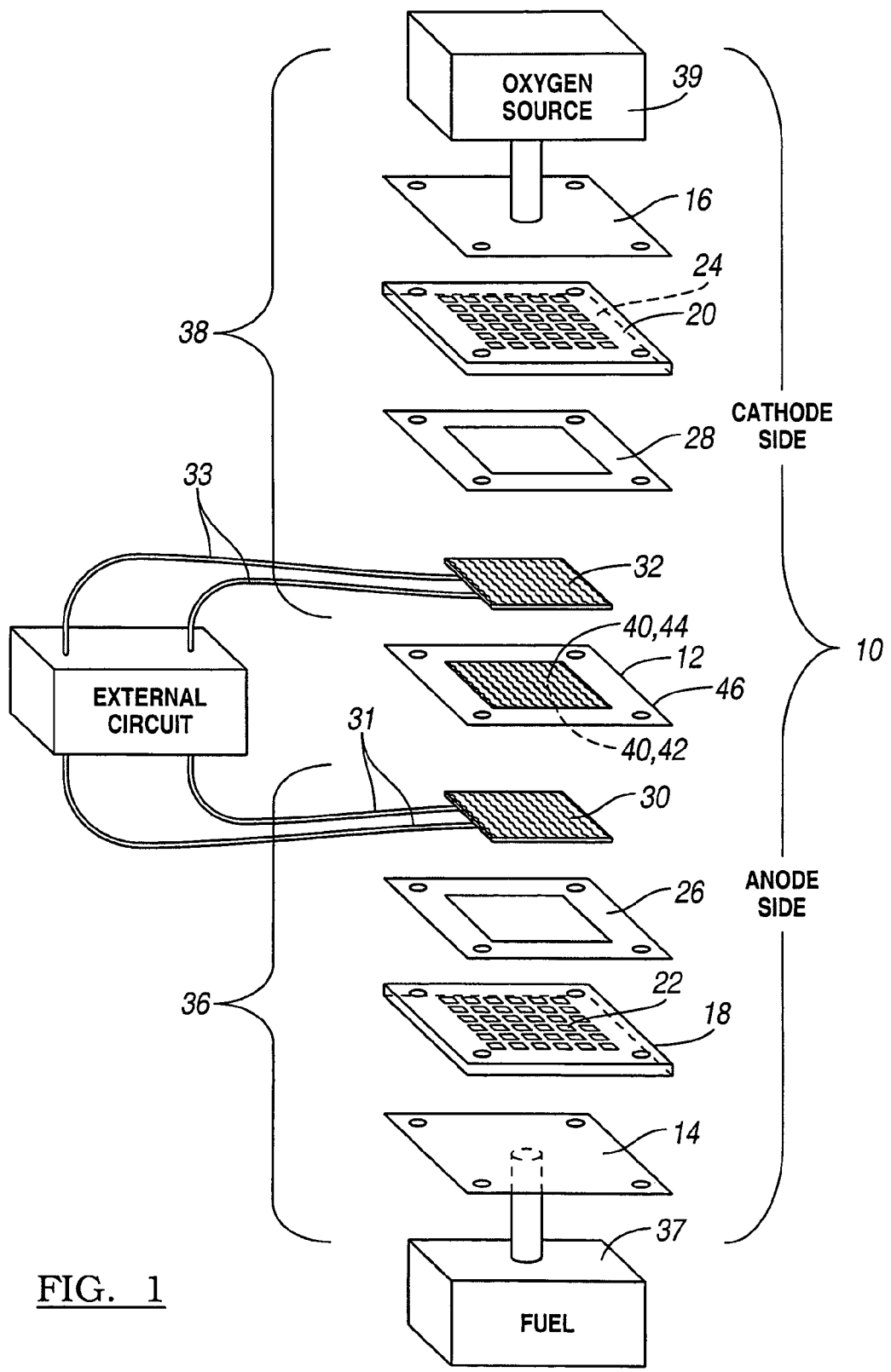
FIG. 1 is a schematic view of an unassembled electrochemical fuel cell having a membrane electrode assembly (MEA) according to the invention.

The invention is directed to forming electrodes and membrane electrode assemblies (MEAs) for use in fuel cells. Before describing the invention in detail, it is useful to understand the basic elements of an exemplary fuel cell and the components of the MEA. Referring to FIG. 1, an electrochemical cell 10 with a combination membrane electrolyte and electrode assembly 12 incorporated therein is shown in pictorial unassembled form. Electrochemical cell 10 is constructed as a fuel cell. However, the invention described herein is applicable to electrochemical cells generally. Electrochemical cell 10 comprises stainless steel endplates 14,16, graphite blocks 18,20 with openings 22,24 to facilitate gas distribution, gaskets 26,28, carbon cloth current collectors 30,32 with respective connections 31,33 and the membrane electrolyte and electrode assembly 12. The two sets of graphite blocks, gaskets, and current collectors, namely 18, 26, 30 and 20, 28, 32 are each referred to as respective gas and current transport means 36,38. Anode connection 31 and cathode connection 33 are used to interconnect with an external circuit, which may include other fuel cells.

Electrochemical fuel cell 10 includes gaseous reactants, one of which is a fuel supplied from fuel source 37, and another is an oxidizer supplied from source 39. The gases from sources 37,39 diffuse through respective gas and current transport means 36 and 38 to opposite sides of the MEA 12. Respectively, 36 and 38 are also referred to as electrically conductive gas distribution media.

Figure 2:
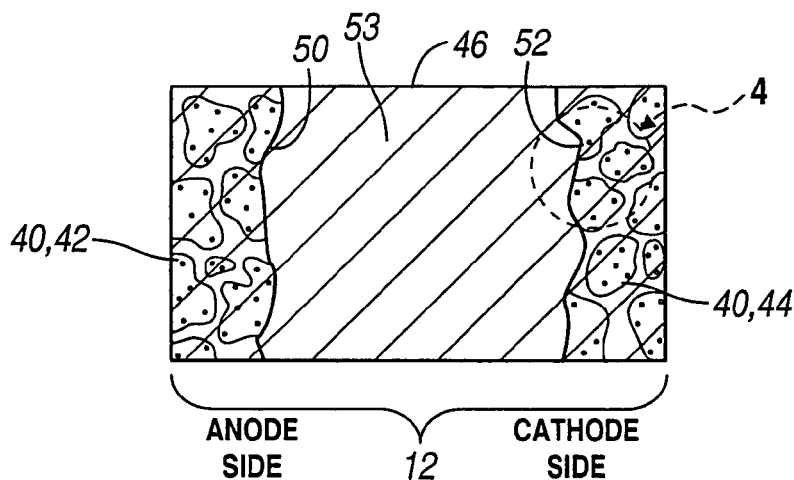
FIG. 2 is a pictorial illustration of a cross-section of an MEA according to the invention.

FIG. 2 shows a schematic view of the assembly 12 according to the present invention. Referring to FIG. 2, porous electrodes 40 form anode 42 at the fuel side and cathode 44 at the oxygen side. Anode 42 is separated from cathode 44 by a solid polymer electrolytic (SPE) membrane 46. SPE membrane 46 provides for ion transport to facilitate reactions in the fuel cell 10. The electrodes of the invention provide proton transfer by intimate contact between the electrode and the ionomer membrane to provide essentially continuous polymeric contact for such proton transfer. Accordingly, the MEA 12 of cell 10 has membrane 46 with spaced apart first and second opposed surfaces 50, 52. a thickness or an intermediate membrane region 53 between surfaces 50, 52. The membrane has first and second regions adjacent to the first and second exterior opposed surfaces having exfoliated aluminosilicate based material disposed therein. Disposed between the region is a region substantially free of exfoliated aluminosilicate based material. Respective electrodes 40, namely anode 42 and cathode 44 are well adhered to membrane 46, at a corresponding one of the surfaces 50, 52.

Figure 3:
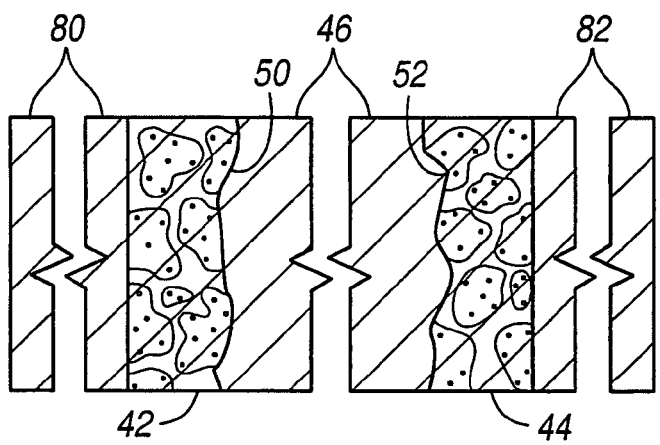
FIG. 3 is a pictorial illustration of an MEA as in FIG. 2, and having graphite sheets.

In one embodiment, respective electrodes 40 (anode 42, cathode 44) further comprise respective first and second Teflonated (polytetrafluoroethylene coated, impregnated) graphite sheets 80, 82, at respective sides of membrane 46. (FIG. 3) The anode active material is disposed between the first surface 50 of the membrane and the first sheet 80; the cathode active material is disposed between the second surface 52 and the second sheet 82. Each Teflonated sheet 80, 82 is about 7.5 to 13 mils thick.

Figure 4:
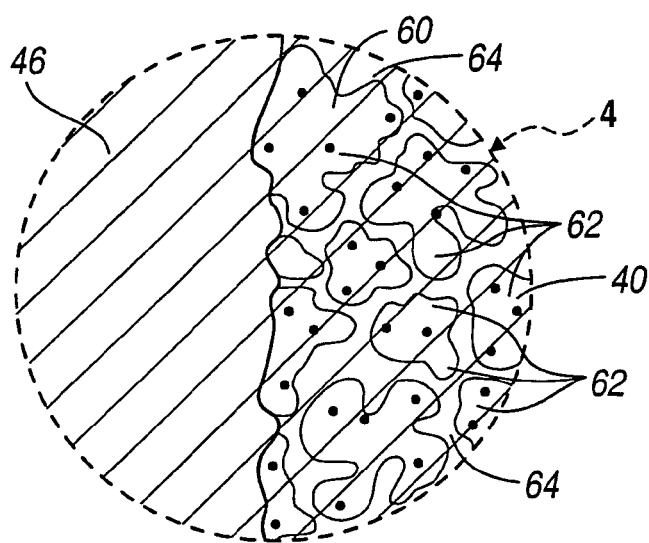
FIG. 4 is a pictorial illustration of a magnified view of a portion of the cathode side of FIG. 2 showing ionomer in the membrane and in the cathode adjacent the membrane.

As shown in FIG. 4, each of the electrodes 40 are formed of a corresponding group of finely divided carbon particles 60 supporting very finely divided catalytic particles 62 and a proton conductive material 64 intermingled with the particles. It should be noted that the carbon particles 60 forming the anode 42 may differ from the carbon particles 60 forming the cathode 44. In addition, the catalyst loading at the anode 42 may differ from the catalyst loading at the cathode 44. Although the characteristics of the carbon particles and the catalyst loading may differ for anode 42 and cathode 44, the basic structure of the two electrodes 40 is otherwise generally similar, as shown in the enlarged portion of FIG. 4 taken from FIG. 2.

In order to provide a continuous path to conduct H.sup.+ ions to the catalyst 62 for reaction, the proton (cation) conductive material 64 is dispersed throughout each of the electrodes 40, is intermingled with the carbon and catalytic particles 60,62 and is disposed in a plurality of the pores defined by the catalytic particles. Accordingly, in FIG. 4, it can be seen that the proton conductive material 64 encompasses carbon and catalytic particles 60,62.

The solid polymer electrolyte membrane (PEM) of the fuel cell is a well-known ion conductive material. Typical PEMs and MEAs are described in U.S. Pat. Nos. 6,663,994, 6,566,004, 6,524,736, 6,521,381, 6,074,692, 5,316,871, and 5,272,017, each of which is made a part hereof and each of which is assigned to General Motors Corporation.

The PEM is formed from ionomers and the method of forming membranes from ionomers is well known in the art. Ionomers (i.e., ion exchange resins) are polymers containing ionic groups in the structures, either on the backbone or side chain. The ionic groups impart ion exchange characteristics to the ionomers and PEM.

Ionomers can be prepared either by polymerizing a mixture of ingredients, one of which contains an ionic constituent, or by attaching ionic groups onto non-ionic polymers.

One broad class of cation exchange, proton conductive resins is the so-called sulfonic acid cation exchange resins, which rely on hydrated sulfonic acid groups for conducting protons. The preferred PEMs are perfluorinated sulfonic acid types. These membranes are commercially available. For example, NAFION® the trade name used by E.I. DuPont de Nemours & Co. Others are sold by Asahi Chemical and Asahi Glass Company, etc. PEMs of this type are made from ionomers obtained by copolymerizing tetrafluoroethylene (TFE) and perfluoro vinyl ether (VE) monomer containing sulfonyl fluoride, followed by a post-treatment that converts sulfonyl fluorides into sulfonic acid groups. Examples of VE monomers are:

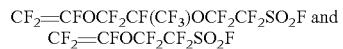
$CF_2\!=\!CFOCF_2CF(CF_3)OCF_2CF_2SO_2F$ and
$CF_2\!=\!CFOCF_2CF_2SO_2F$ The ionomer molecules consist of a fluoropolymer backbone, similar to PTFE (Teflon), upon which sulfonic acid groups are chemically bonded as side groups. A key feature of sulphonic acid is that is highly hydrophyllic, it attracts water and forms hydrated regions. The H+ ions are weakly attracted to the SO3- group and are able to move, giving rise to proton conductivity. The strong bonds between the fluorine and the carbon make NAFION® durable and resistant to chemical attack in strong bases, strong oxidizing and reducing acids, $H_2O_2$, $Cl_2$, $H_2$, and $O_2$ at temperatures up to 125° C. An important property of the fluoropolymer backbone is that it is strongly hydrophobic. This property is used in fuel cell electrodes to drive the product, water, out of the electrode and thus prevent flooding.

Although NAFION® is used for PEM membranes, further improvement is desired in the properties of membranes, including their mechanical properties. The potential benefits of improved mechanical properties include (1) thinner membranes to promote proton transport, (2) improved dimensional stability by reducing water swelling, (3) higher temperature stability, and (4) increased durability. The difficulty of maintaining physical and mechanical properties and dimensional stability of an ionically conductive membrane is described in U.S. Pat. No. 6,074,692, which is made a part hereof and assigned to General Motors Corporation.

In view of the above difficulty, the invention provides a fuel cell comprising an MEA having a PEM, solid polymer electrolyte membrane sandwiched between first and second electrodes where such PEM in the form of a composite. Some or all components of cell 10 comprising the ionomer are formed of a composite. Preferably, the membrane is formed of such composite. The membrane is also referred to as electrolyte or SPE. The constituents of the composite and the method of forming such composite provide improved properties. In one aspect, the composite comprises ionically conductive polymer and an inorganic filler, an aluminosilicate-based exchange material having cationic exchange sites, such as clay, zeolite, alumina and the like; and preferably is montmorillonite (MM). Additionally the aluminosilicate-based exchange material can be a clay which includes, but is not limited to at least one of smectite, hectorite, montmorillonite, bentonite, beidelite, saponite, stevensite, sauconite, nontronite, and mixtures thereof.

For ease of description, such materials are exemplified as the preferred MM. The MM has cationic sites, at least some of which are occupied by Group 1 metal cations. Preferably, the greatest proportion of such sites are occupied by Group 1 metal cations. More desirably, the MM is sodium-enriched MM. The concentration of these cationic sites is normally expressed as a Milliequivalent Ratio, or MER. This ratio is the number of charge equivalents needed to fully neutralize the charge on 100 grams of aluminosilicate clay. Specifically, the Group 1 metal cation, desirably sodium is present in a concentration at least 30% of the MER, more desirably at least 50% of the MER, and preferably at least 75% of the MER.

The above cation site character is in contrast to known MM product having organic treatments, being in the form of organic MM. The organic charged species replaces the sodium during an ion exchange reaction that results in the formation of the organo-clay. Such organic MM is in contrast to the inorganic MM of the present invention. The MM of the invention is in contrast to treated MM having hydrogen (H+) at cationic sites.

In one aspect, the membrane comprises the ionically conductive polymer and the inorganic MM. In another aspect, at least a portion of the electrode layer also comprises the ionically conductive polymer and the inorganic MM.

The MM is preferably represented by $Na_xM_y$MM where X plus Y equals the number of cationic sites, X is greater than Y, and M represents a cation or mixture of cations.

The polymer preferably occupies gallery spaces of the MM. The MM is preferably in the form of platelets and the platelets are dispersed in the polymer. Alternatively, the MM is in the form of a group of platelets and the group of platelets are dispersed in the polymer. The platelets can have a mean particle size of between about 70 nm and about 300 nm an thickness between about 5 and 10 nm. In this regard, the exfoliated MM particles can have an aspect ration between 10 and 50.

The MM is present in an amount effective to increase mechanical strength of the membrane. The polymer is preferably a perfluorosulfonate ionomer.

The polymer desirably constitutes at least 85 parts and more desirably at least 90 parts by weight based on 100 parts of MM and polymer; and the MM is present so as to constitute desirably less than 15 parts and more desirably greater than a few parts by weight. Thus, a target of about 95/5 polymer/MM is desired. The polymer preferably constitutes up to 94 parts by weight based on 100 parts of MM and polymer. The MM is preferably present in an amount by weight of at least 6 parts based on 100 parts of MM and polymer.

Thus, in its basic aspect, the invention provides a composite electrolyte membrane comprising exfoliated aluminosilicate-based exchange material, preferably montmorillonite (MM), dispersed in an ionically conductive polymer matrix, where the MM has cation exchange sites with at least a portion of the sites having Group 1 metal cations, preferably sodium. The exemplary MM has an MER of about 95 milliequivalents per 100 grams montmorillonite with at least 75% of the MER being sodium.

A number of terms are used herein as follows: A and an as used herein indicates "at least one" of the item is present; a plurality of such items may be present, when possible. About, when applied to values, indicates that the calculation or the measurement allows some slight imprecision in the value (with some approach to exactness in the value; approximately or reasonably close to the value; nearly). If, for some reason, the imprecision provided by about is not otherwise understood in the art with this ordinary meaning, then about as used herein indicates a possible variation of up to 5% in the value. As used herein MEA refers to the membrane electrode assembly and any of its individual parts, alone or in combination. The composite is referred to as being included in the membrane, for ease of description; however, it is to be understood that the composite may be in the fuel cell anywhere, including the membrane, the electrode or both.

Example 1

The nanocomposite membranes were prepared from 5 wt. % NAFION® perfluorinated resin solution containing lower aliphatic alcohols and 15-20% water. Sodium exchanged montmorillonite clay, CLOISITE® Na+ clay, was added to the commercially available NAFION® polymer solution and diluted with methanol to yield the equivalent of a 6 wt. % clay reinforced NAFION® thin film when the solvents were later flashed-off at room temperature. Before flash-off of solvent, the mixtures were sonicated for six hours to exfoliate the clay particles. Then the clay and polymer solution casts onto two inch silicon wafers with an Integrated Technologies P6000 spin coater rotated at 500 rpm for 3 seconds. Specifications of the clay as used herein are given below.

For comparison, thin films of NAFION® without the clay particles were also cast onto silicon wafers from the undiluted solution. See Comparative Example below.

Figure 5:
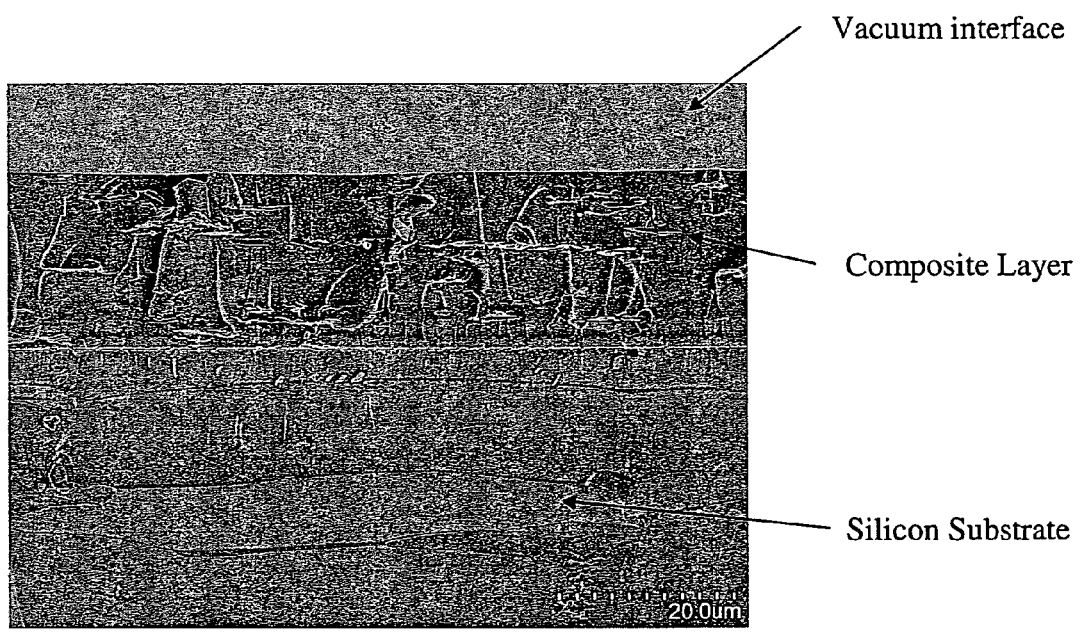
FIG. 5 shows an SEM cross-sectional view of a nanocomposite membrane.

The nanocomposite membranes prepared by the method have a thickness of about 20 micrometers (FIG. 5). FIG. 5 shows an SEM cross-sectional view of a nanocomposite membrane.

Figure 6A:
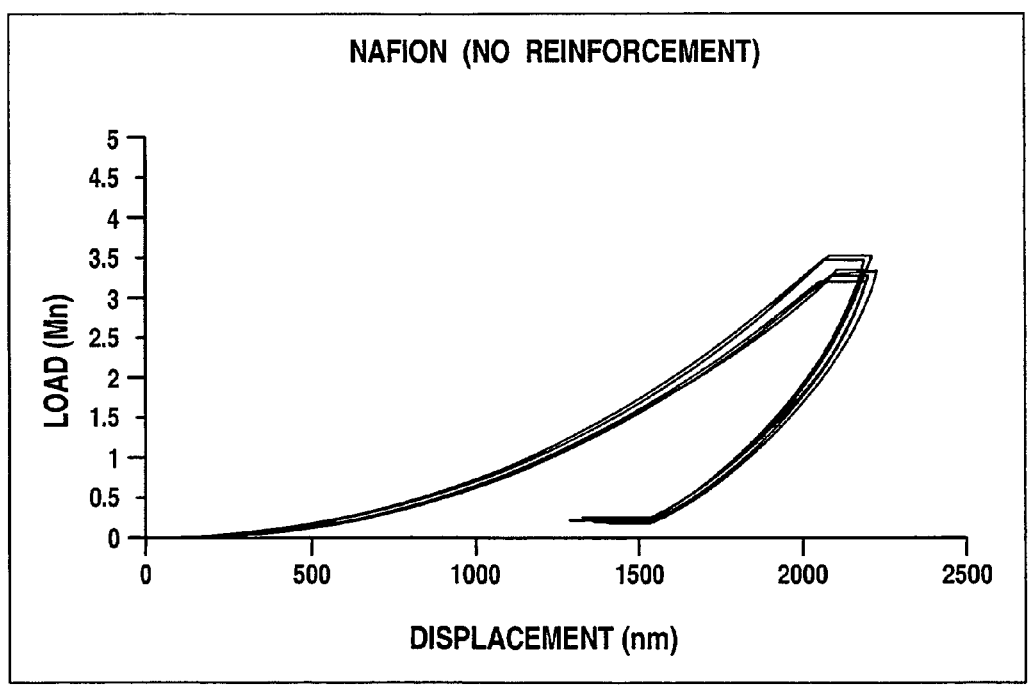
FIGS. 6A and 6B are the load-displacement curves of indentation in a NAFION® without the montmorillonite clay particles (6A) and that with the montmorillonite clay particles (6B), respectively.
Figure 6B:
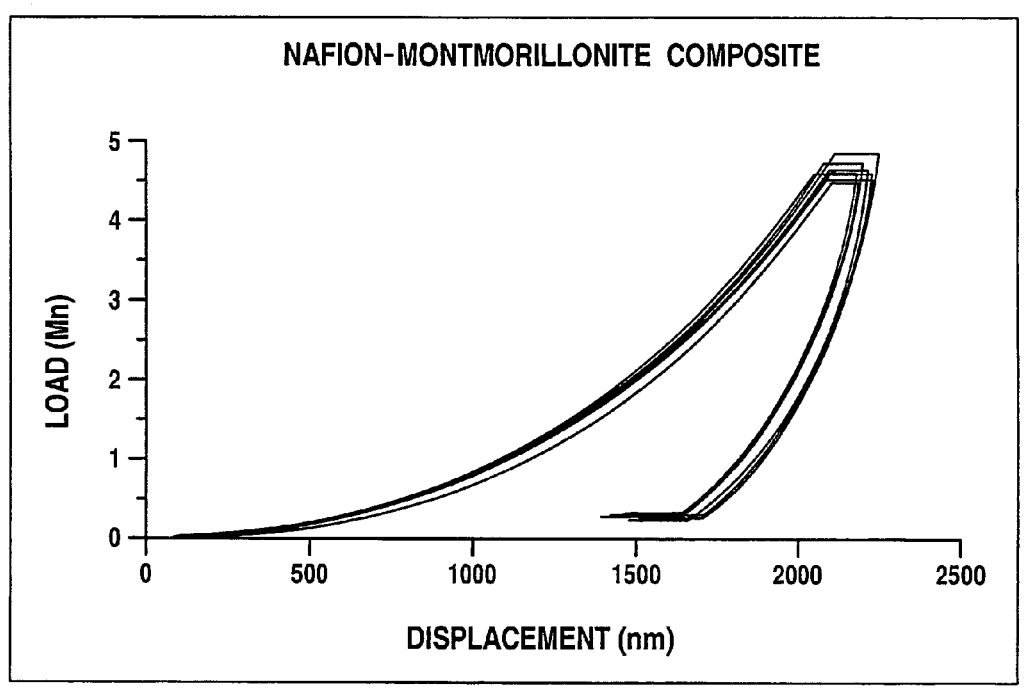

The mechanical properties of the NAFION® films were characterized by using a MTS Nano XP Nanoindenter with a Berkovich indenter. The XP was operated in continuous stiffness mode (CSM) to make depth controlled indents to 2000 nm at a targeted strain rate $(dP/dt)/P$ of 0.05 s-1. Three by three arrays of indents were used to determine the hardness and modulus values calculated by the Oliver-Pharr method of analysis. FIGS. 6A and 6B are the load-displacement curves of indentation in a NAFION® without the montmorillonite clay particles (6A) and that with the montmorillonite clay particles (6B), respectively. The force (in millinewtons) required to reach the same indentation depth (in nanometers) is significantly higher for the nanocomposite NAFION®/montmorillonite clay composite membranes than that of unmodified NAFION®. The increased force needed to indent the composite demonstrates its improved mechanical properties. The elastic modulus and hardness of the NAFION® and NAFION®/montmorillonite clay composite membranes are summarized in Table 1.

TABLE 1

|  | Elastic modulus (MPa) | Hardness (MPa) |
| --- | --- | --- |
| NAFION ® membrane | 664 | 33 |
| NAFION ® /montmorillonite clay composite | 1230 | 42 |

Thus, the elastic modulus and hardness of NAFION® membranes can be increased significantly through the introduction of montmorillonite clay particles in the membranes.

Example 2

111 NAFION® films were spin-cast containing 3, 6, 9 and 12 wt. % montmorillonite clay reinforcement. Appropriate masses of clays were added to a 15 ml. NAFION®-20 ml methanol solution and sonicated for 48 hours. Alternatively, similar solutions were prepared to achieve the same concentrations of clay and high shear mixed for less than 10 minutes (longer high shear mixing damages the NAFION®). The mixed solutions were then spin-cast into two inch silicon wafer at less than 200 rpm and allowed to flash-off the methanol at room temperature.

Example 3

Further composite membranes were prepared using starting materials and methods as per Example 1 and Example 2 above, except that exfoliation of the clay was conducted before combing the clay with the polymer. This better preserved the character of the polymer, preventing fragmentation or damage to the polymer.

Specification of Na+MM:

CLOISITE® Na⁺ is a natural montmorillonite available from Southern Clay Products, Inc., 1212 Church Street Gonzales, Tex. 78629 USA. The properties of the clay, as used, are given below.

Typical properties of CLOISITE® Na⁺ are: no organic modifier; cation exchange capacity of 92.6 meq/100 g clay; and <2% moisture.

Typical dry particle sizes in microns, by volume, are: 10% less than 2μ; 50% less than 6μ; and 90% less than 13μ (micrometers).

The density is as follows: loose bulk is 12.45 lbs/ft$^3$; packed bulk is 20.95 lbs/ft$^3$; and specific gravity is 2.86 g/cc.

X-ray results are $d_{001}$=11.7 Å.

Comparative Example

NAFION® Cast Film

The comparative membranes were prepared from 5 wt. % NAFION® perfluorinated resin solution containing lower aliphatic alcohols and 15-20% water. The commercially available NAFION® solution was cast to form thin films of NAFION® (without the clay particles) cast onto silicon wafers from the undiluted solution.

The comparative membranes prepared without clay have a thickness of about 20 micrometers and less attractive performance as in FIG. 6A. The mechanical properties of these comparative NAFION® films were characterized by using a MTS Nano XP Nanoindenter with a Berkovich indenter as described in Example 1 above.

As can be seen from the data and figures, the NAFION®/montmorillonite clay composite membranes of about 20 micrometer thick perform significantly better than equivalent thickness membranes prepared without the clay. The elastic modulus and hardness, measured by nanoindentation, are about 100% and at least 50% higher than the membrane without the montmorillonite clays.

The layered structure of montmorillonite clay is the result of forces, such as electrostatic forces, that retain the structure. Such forces are overcome by exfoliative techniques. The exfoliation separates the adjacent clay platelets. The stacked platelet structure is separated into high-aspect-ratio individual platelets, or groups of platelets, that are nano-sized platelets. Nano-sized platelets are used herein to increase strength of the polymer matrix without reducing other properties. The sodium form of MM platelets is particularly advantageous for strength, conductivity and stability.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A fuel cell comprising:
a membrane electrode assembly comprising a monolithic membrane sandwiched between first and second electrodes;
said membrane comprising exfoliated aluminosilicate-based cation-exchange material dispersed in an ionically conductive polymer matrix, where the aluminosilicate-based cation-exchange material has cation exchange sites with at least a portion of the sites having Group 1 metal cations, said membrane having first and second exterior opposed surfaces, said membrane having first and second regions adjacent to the first and second exterior opposed surfaces, said first and second regions layers having the exfoliated aluminosilicate-based material disposed therein, and a central layer region disposed between the first and second regions, being substantially free of exfoliated aluminosilicate-based material, wherein the ionically conductive polymer matrix contiguously couples the first and second exterior opposed surfaces, wherein the polymer matrix is a perfluorosulfonate ionomer, and wherein polymer constitutes up to 94 parts by weight based on 100 parts of aluminosilicate-based cation exchange material and polymer matrix.

2. The fuel cell of claim 1, wherein the Group 1 metal cation of said cation-exchanged aluminosilicate-based exchange material includes sodium.

3. The fuel cell of claim 2, wherein the sodium is present at said sites in an atomic amount greater than a combined amount of any other metals.

4. The fuel cell of claim 1, wherein the Group 1 metal cation is present at said sites in an atomic amount greater than a combined amount of any other metals.

5. The fuel cell of claim 1, wherein the aluminosilicate-based exchange material is a sodium-enriched montmorillonite.

6. The fuel cell of claim 1, wherein the polymer matrix occupies gallery spaces of the aluminosilicate-based cation exchange material.

7. The fuel cell of claim 1, wherein the aluminosilicate-based cation exchange material is in the form of platelets and the platelets are dispersed in the polymer matrix.

8. The fuel cell of claim 1, wherein the aluminosilicate-based cation exchange material is in the form a group of platelets and the group of platelets are dispersed in the polymer matrix.

9. The fuel cell of claim 1, wherein the aluminosilicate-based exchange material comprises a clay which is at least one of smectite, hectorite, montmorillonite, bentonite, beidelite, saponite, stevensite, sauconite, nontronite, and mixtures thereof.

10. The fuel cell of claim 1, wherein the aluminosilicate-based cation exchange material is present in an amount by weight of at least 6 parts based on 100 parts of aluminosilicate-based exchange material and polymer matrix.

11. The fuel cell of claim 1, wherein, on the basis of 100 parts by weight aluminosilicate-based cation exchange material and polymer matrix, the polymer matrix constitutes about 95 parts and the aluminosilicate-based exchange material constitutes the balance.

12. The fuel cell of claim 1, wherein the exfoliated aluminosilicate-based cation exchange material is montmorillonite.

13. A fuel cell comprising:
a monolithic membrane electrode assembly comprising a membrane sandwiched between first and second electrodes, said membrane having a first and second opposed exterior surface, said membrane having a first region having a first thickness adjacent to the first exterior surface and a second region having a second region having a second thickness adjacent the second exterior surface, a central region having a central region thickness disposed between the first and second regions;
said membrane comprising an exfoliated Group 1 metal-enriched clay based exchange material dispersed in an ionically conductive perfluorosulfonate ionomer polymer matrix, wherein said clay based exchange material has cation exchange sites with at least a portion of the cation exchange sites having Group 1 metal captions, said membrane having first and second exterior regions having the exfoliated Group 1 metal-enriched clay based exchange material disposed therein, and a central layer region being substantially free of exfoliated Group 1 metal-enriched clay based exchange-based material wherein the ionomer matrix is contiguous between the first and second opposed exterior surfaces, wherein the polymer matrix is a perfluorosulfonate ionomer, and wherein polymer constitutes up to 94 parts by weight based on 100 parts of aluminosilicate-based cation exchange material and polymer matrix.

14. The fuel cell of claim 13, wherein the Group 1 metal cations of said clay based exchange material includes sodium.

15. The fuel cell of claim 14, wherein the sodium is present at said cation exchange sites in an atomic amount greater than a combined amount of any other metals.

16. The fuel cell of claim 15, wherein the clay is at least one of smectite, hectorite, montmorillonite, bentonite, beidelite, saponite, stevensite, sauconite, nontronite, and mixtures thereof.

* * * * *